(12) United States Patent
Miller et al.

(10) Patent No.: US 10,334,022 B2
(45) Date of Patent: Jun. 25, 2019

(54) FUEL THEFT DETECTION

(71) Applicant: NCR Corporation, Duluth, GA (US)

(72) Inventors: Joel Aaron Miller, Atlanta, GA (US); Steven Jarrett Giera, Dacula, GA (US); Erick Kobres, Lawrenceville, GA (US)

(73) Assignee: NCR Corporation, Atlanta, GA (US)

( * ) Notice: Subject to any disclaimer, the term of this patent is extended or adjusted under 35 U.S.C. 154(b) by 712 days.

(21) Appl. No.: 14/264,855

(22) Filed: Apr. 29, 2014

(65) Prior Publication Data

US 2015/0309488 A1 Oct. 29, 2015

(51) Int. Cl.
| G08B 13/00 | (2006.01) |
| H04L 29/08 | (2006.01) |
| G05D 7/00 | (2006.01) |
| G05D 11/00 | (2006.01) |

(52) U.S. Cl.
CPC .............. *H04L 67/10* (2013.01); *G08B 13/00* (2013.01)

(58) Field of Classification Search
CPC ................................ G08B 13/00; H04L 67/10
USPC .......................................... 700/283; 426/283
See application file for complete search history.

(56) References Cited

U.S. PATENT DOCUMENTS

| 5,361,216 A * | 11/1994 | Warn ..................... B67D 7/228 700/236 |
| 5,363,093 A * | 11/1994 | Williams ................ B67D 7/08 340/605 |
| 5,400,253 A * | 3/1995 | O'Connor ................ B67D 7/08 700/236 |
| 5,602,745 A * | 2/1997 | Atchley .................. B67D 7/222 222/23 |
| 5,694,326 A * | 12/1997 | Warn ..................... G07F 13/025 700/231 |
| 6,390,151 B1 * | 5/2002 | Christman ........... B67D 7/0401 141/231 |
| 8,376,185 B2 * | 2/2013 | Liebal ...................... B67D 7/08 137/1 |
| 8,744,669 B1 * | 6/2014 | Peraza .................... G07C 5/008 701/32.4 |
| 2003/0065630 A1 * | 4/2003 | Brown .................... B67D 7/348 705/413 |
| 2004/0148088 A1 * | 7/2004 | Davis ....................... G07C 5/008 701/123 |
| 2004/0215575 A1 * | 10/2004 | Garrity ................... G06Q 20/20 705/64 |

(Continued)

*Primary Examiner* — Ryan D. Coyer
(74) *Attorney, Agent, or Firm* — Schwegman, Lundberg & Woessner (57) ABSTRACT

Various embodiments each include at least one of systems, methods, and software to detect possible fuel theft and to provide notification thereof. In a simple embodiment, data from a fuel pump is obtained, either directly or via a fuel pump controller, by a fuel station site controller and stored. The stored data includes a measure of a total amount of fuel dispensed from the fuel pump, such as may be measured by a fuel pump feedstock meter. At a time when the site controller reestablishes data communication with the fuel pump controller after a loss, the site controller receives a fuel pump data update. The updated data is then compared to the stored measure. When there is a mismatch, a possible fuel theft has occurred and an alarm process may be triggered.

17 Claims, 4 Drawing Sheets

(56) References Cited

U.S. PATENT DOCUMENTS

| | | | |
|---|---|---|---|
| 2009/0045925 A1* | 2/2009 | Demin | B67D 7/3236 340/12.32 |
| 2010/0332363 A1* | 12/2010 | Duddle | B67D 7/348 705/34 |
| 2014/0207277 A1* | 7/2014 | Broome | G06Q 20/32 700/237 |

* cited by examiner

FUEL THEFT DETECTION

BACKGROUND INFORMATION

The self-service industry continues to grow as customers become savvier with technology and desire fast transactions. One particular area of self-service that is growing rapidly is the use of self-service fuel pumps at gas stations. These fuel pumps may be equipped to dispense fuel and accept payment for the fuel, thereby allowing a customer to complete and pay for a fuel transaction without entering the store.

Such fuel pumps that accept payments include point-of-sale (POS) terminals that receive data with regard to a fuel amount dispensed, a cost per unit of dispensed fuel, customer payment information, and other data. An amount charged is based at least in part on an amount of dispensed fuel. Fuel pump POS terminals have become susceptible to tampering. The tampering may involve modifications to, or disabling of, data flowing to the POS terminal with regard to the amount of dispensed fuel, such as through manipulation of a fuel pump pulser or disabling a data communication connection of a POS terminal. Regardless of the tamper mode, when the POS terminal fails to receive or to report accurate data of a measure of dispensed fuel, financial transaction data, and other data, fuel theft is possible and theft detection is difficult.

SUMMARY

Various embodiments include at least one of systems, methods, and software to detect possible fuel theft and to provide notification thereof. In one embodiment, fuel pump data is obtained by a fuel station site controller and stored, including data of a measure of a total dispensed fuel amount from the fuel pump, such as may be measured by a fuel pump feedstock meter. At a time when the site controller reestablishes data communication with the fuel pump controller after a loss, the site controller receives a fuel pump data update. The updated data is then compared to the stored measure. When there is a mismatch, a possible fuel theft has occurred and an alarm process may be triggered. The site controller may also trigger the alarm when the data connectivity is either lost or after a certain period has elapsed. One or more triggering events may be defined within configuration settings, such as configuration settings of the site controller. The alarm process may also be configured, such as through configuration settings of the site controller, to perform different actions, such as to provide audible and visual alarms, to send text-based messages, to send emails, to disable one or more fuel pumps, and the like.

DETAILED DESCRIPTION

Various embodiments herein each include at least one of systems, methods, and software to detect possible fuel theft and to provide notification thereof. In a simple embodiment, data from a fuel pump is obtained by a fuel station site controller and stored. The data may be obtained, in some embodiments, from a fuel controller present within or otherwise associated with the fuel pump. The obtained and stored data includes a measure of a total amount of fuel dispensed from the fuel pump, such as may be measured by a feedstock meter of the fuel pump that measures all fuel dispensed by the pump. The site controller may then identify a loss of data connectivity with the fuel pump controller. At a time when the site controller reestablishes data communication with the fuel pump controller, the site controller receives data representative of the measure of the total amount of fuel dispensed from the fuel pump. The site controller then compares the newly received measure and the stored measure. When there is a mismatch, a possible fuel theft has occurred and an alarm process may be triggered. The site controller may also trigger the alarm when the data connectivity with the fuel pump controller is either lost or after a certain period has elapsed. One or more triggering events may be defined within configuration settings, such as configuration settings of the site controller. The alarm process may also be configured, such as through configuration settings of the site controller, to perform different actions, such as to provide audible and visual alarms, to send text-based messages, to send emails, to disable one or more fuel pumps, and the like. While the site controller and alarm process may be deployed on site with fuel pumps and fuel pump controllers in some embodiments, in other embodiments, all or a portion of the site controller and alarm process functionality may be deployed remotely, such as in a cloud-based computing arrangement. These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
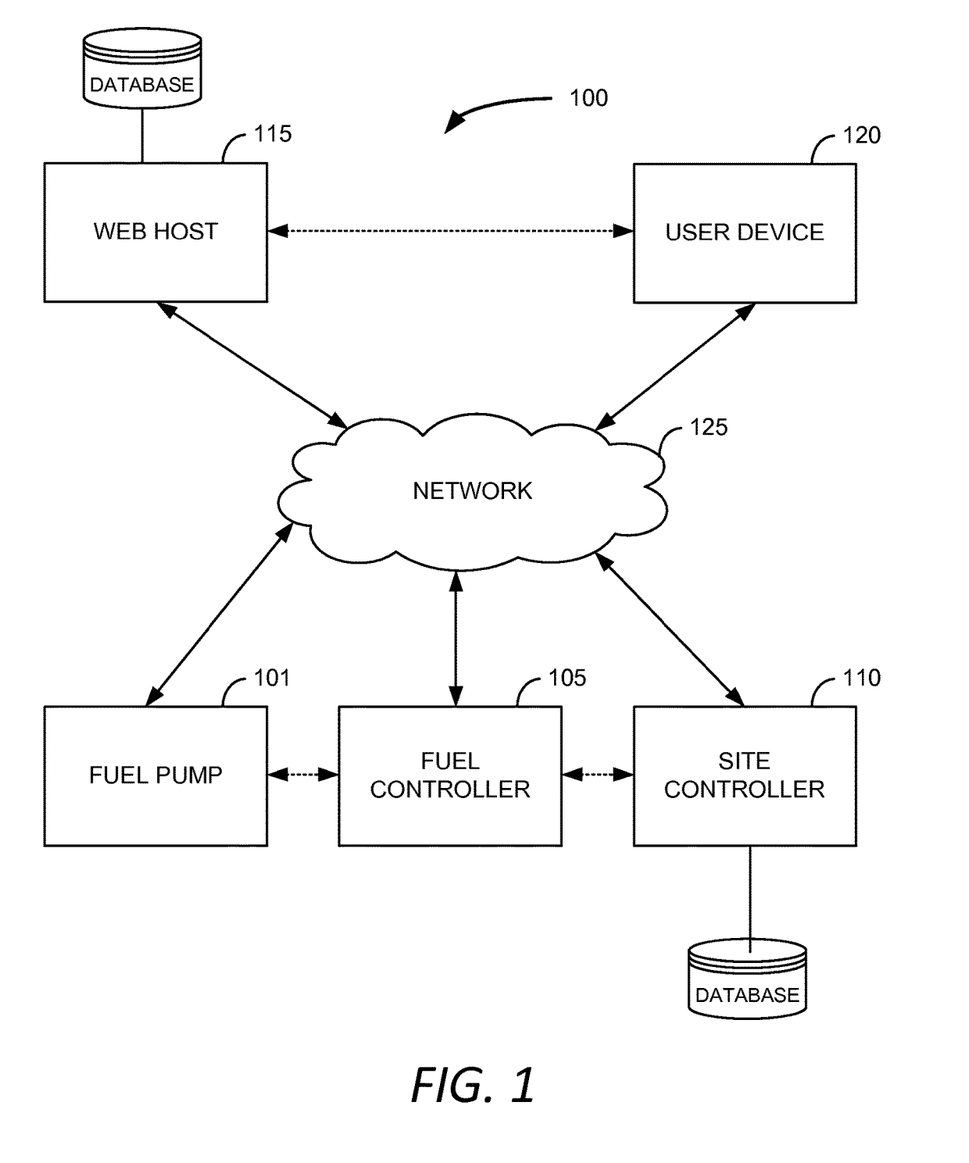
FIG. 1 is a block diagram of a system, according to an example embodiment.

FIG. 1 is a block diagram of a system 100, according to an example embodiment. The system 100 is an example that may be implemented in conjunction with various embodiments to evaluate fuel pump data to determine and communicate alarm conditions indicative of possible fuel theft. As shown in FIG. 1, the system 100 may include one or more fuel pumps 101. A fuel pump 101 typically includes hardware for delivering fuel to a customer and may include hardware for facilitating payment for dispensed fuel at the fuel pump, such as a POS terminal (e.g., a card reader, display, interface, and/or printer). The system 100 may further include one or more fuel controllers 105. A fuel controller 105 may be embodied as a POS terminal or a modified POS terminal providing additional functionality over a typical POS terminal, for instance functionality for interfacing with a fuel pump 101. The fuel controller 105 may therefore be included in a housing of a fuel pump 101, which may also include one or more additional fuel pumps such as for each of two or more fuel grades or types. Additionally, the system 100 may include one or more site controllers 110. A site controller 110 may be embodied as a POS terminal or a modified POS terminal providing additional functionality over a typical POS terminal, for instance functionality for interfacing between a fuel controller 105 and a web host 115. In some embodiments, a site controller may be located within a building of a fuel station and fuel station attendants may interact with the site controller 110 to activate fuel pumps 101, monitor fuel pump 101 and fuel controller 105 usage, and the like. In further embodiments, the site controller 110 may be located on the network 125 remotely from a fuel station where one or more fuel pumps 101 and fuel controllers 105 are located. In such embodiments, the site controller may be cloud-based, co-located with a web host 115, or in another location accessible via the network 125, such as the Internet. The system 100 may further comprise one or more web hosts 115. A web host may be embodied as a host, web server, cloud server, and the like. Furthermore, the system 100 may include one or more user devices 120. For instance, a user device 120 may be embodied as a smartphone device, mobile telephone, mobile computer, portable digital assistant (PDA), laptop computer, desktop computer, gaming device, electronic tablet, or any other type of similar electronic device.

Each entity of the system 100 may be connected, directly or indirectly, to one or more other entities of the system 100 via serial connections or one or more networks 125. The network 125 may be a wired and/or wireless network comprising one or more of a local area network, wide area network, cellular network, the Internet, and the like. In some instances, a fuel pump 101 may be configured to communicate directly with one or both of a fuel controller 105 and a site controller 110. In other instances, a fuel controller 105 may be configured to communicate directly with a site controller 110. In certain instances, a web host 115 may be configured to communicate directly with one or more user devices 120. It should be noted that other system architectures are contemplated that may be implemented in various embodiments. Thus, the system 100 of FIG. 1 is provided for illustrative purposes and should not be construed as limiting in the scope. Further, while FIG. 1 illustrates certain system entities as separate, standalone entities, the various embodiments are not limited to this particular architecture.

Figure 2:
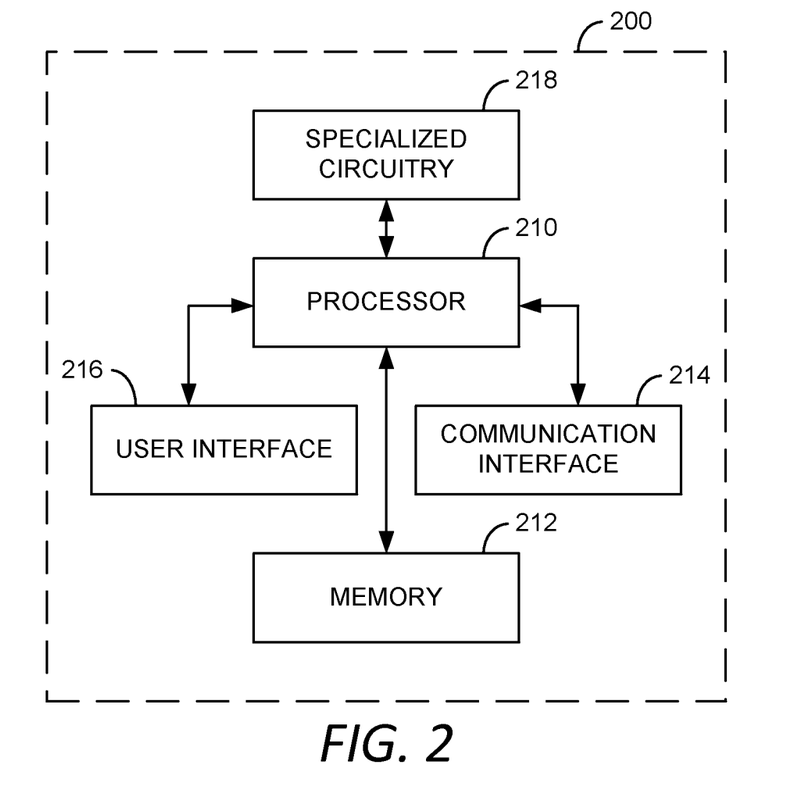
FIG. 2 is a block diagram of a computing device, according to an example embodiment.

In various embodiments, a fuel pump 101, a fuel controller 105, a site controller 110, a web host 115, and a user device 120 may be embodied as or otherwise include an apparatus 200 as generically represented by the block diagram of FIG. 2. In the example embodiment, the apparatus 200 may include various mechanisms, devices, modules, and software for performing the various functions herein described. Such mechanisms, devices, modules, and software may include one or more of a processor 210, memory 212, communication interface 214, user interface 216, or specialized circuitry 218 that may be in communication with one another, such as via a bus.

The mechanisms, devices, modules, and software of the apparatus 200 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 212) that is executable by a suitably configured processing device (e.g., the processor 210), or various combinations thereof. In some example embodiments, the processor 210, memory 212, communication interface 214, user interface 216, and specialized circuitry 218 may be embodied in a chip or chip set.

The processor 210 may, for example, be embodied as various elements including circuitry, one or more microprocessors with accompanying digital signal processor(s), one or more processor(s) without an accompanying digital signal processor, one or more coprocessors, one or more multi-core processors, one or more controllers, one or more computers, various other processing elements including integrated circuits such as, for example, an ASIC (application specific integrated circuit) or FPGA (field programmable gate array), one or more other hardware processors, or some combination thereof. Although illustrated in FIG. 2 as a single processor, in some embodiments the processor 210 may comprise a plurality of processors. The plurality of processors may be in operative communication with each other and may be collectively configured to perform one or more functionalities of the apparatus 200 as described herein. The plurality of processors may be embodied on a single device or distributed across a plurality of devices collectively configured to function as the apparatus 200.

In some example embodiments, the processor 210 may be configured to execute instructions stored in the memory 212 or memory otherwise accessible to the processor 210. These instructions, when executed by the processor 210, may cause the apparatus 200 to perform one or more of the functionalities of the apparatus 200 as described herein. Further, the processor 210 may comprise functionality to operate one or more software programs, which may be stored in memory. For example, the processor 210 may be capable of operating a connectivity program, such as a web browser, POS terminal software, site controller 110 software, fuel controller 105 software, and the like. The connectivity program may allow the apparatus 200 to transmit and receive data according to a protocol, such as Wireless Application Protocol (WAP), hypertext transfer protocol (HTTP), and the like. The apparatus 200 may be capable of using protocol(s), such as Transmission Control Protocol/Internet Protocol (TCP/IP), to transmit and receive data via one or more of a local network, the Internet, and other networks.

The memory 212 may comprise, for example, volatile memory, non-volatile memory, or some combination thereof. In this regard, the memory 212 may comprise one or more tangible and/or non-transitory computer-readable storage media that may include volatile and/or non-volatile memory. Although illustrated in FIG. 2 as a single memory, the memory 212 may comprise a plurality of memories. The plurality of memories may be embodied on a single device or may be distributed across a plurality of devices collectively configured to function as the apparatus 200. In various example embodiments, the memory 212 may comprise a magnetic storage device (e.g., hard disk), dynamic and/or static random access memory (RAM), read only memory (ROM), cache memory, flash memory, optical disc, subscriber identity module (SIM), removable user identity module (R-UIM), circuitry configured to store information, or some combination thereof. The memory 212 may be configured to store information, data, applications (e.g., software programs), instructions, and/or the like, in some instances for execution by the processor 210, for enabling the apparatus 200 to carry out various functions in accordance with various example embodiments.

The communication interface 214 may be embodied as any device or means embodied in circuitry, hardware, a computer program product comprising computer readable program instructions stored on a computer readable medium (for example, the memory 212) and executed by a processing device (for example, the processor 210), or a combination thereof that is configured to receive and/or transmit data from/to another computing device. The communication interface 214 may include, for example, an antenna, a transmitter, a receiver, a transceiver, and/or supporting hardware or software for enabling communications with one or more remote devices. The communication interface 214 may be configured to receive and/or transmit data using any protocol that may be used for communications between devices.

The user interface 216 may be in communication with the processor 210 to receive an indication of a user input and/or to provide an audible, visual, mechanical, or other output to a user. As such, the user interface 216 may include, for example, a keyboard, keypad, scanner, printer, mouse, joystick, display (e.g., touch screen display), microphone, speaker, and/or other input/output mechanisms. The processor 210 and user interface circuitry comprising the processor 210 may be configured to control one or more functions of the user interface 216 through computer program instructions (e.g., software and/or firmware) stored on memory (e.g., memory 212) accessible to the processor 210.

The specialized circuitry 218, when included in a particular embodiment, may be embodied as various forms, such as circuitry, hardware, a computer program product including computer readable program instructions stored on a computer readable medium (for example, the memory 212) and executed by a processing device (for example, the processor 210), or some combination thereof and, in some embodiments, is embodied as or otherwise controlled by the processor 210.

In some embodiments, with reference to both FIG. 1 and FIG. 2, an apparatus 200 is implemented as a site controller 110. The site controller of such embodiments includes a dispensed fuel monitoring module stored in memory 212 and executable by processor 210 to establish data connectivity, via the communication interface 214, with at least one fuel controller 105. The data connectivity may be continuous, established on an ad-hoc basis as needed or according to a periodic schedule. The communication interface 214, in such embodiments, may include one or more of a wired or wireless network interface device, a serial connection device, and other wired or wireless data connection devices. The dispensed fuel monitoring module of the site controller 110 receives data representative of a dispensed fuel amount from a fuel controller 105 of, or otherwise associated with, a fuel pump 101. Note, that as mentioned above, the site controller 110, wherein the dispensed fuel monitoring module may be deployed, may be located on site with one or more fuel pumps 101 and fuel controllers 105, such as at a fuel station. As also noted previously, the site controller 110, in some embodiments, may be located remotely, such as in a cloud-hosted arrangement. The dispensed fuel amount is obtained by a fuel controller 105 from a feedstock meter of the fuel pump 101. The feedstock meter measures a total amount of fuel dispensed from a fuel pump 101 without regard to a specific transaction and is therefore distinct from a meter that measures fuel dispensed within purchase transactions, such as may be measured by a pulser that provides a measure of dispensed fuel to the fuel controller 105 with regard to an instant transaction.

In such embodiments, the dispensed fuel monitoring module stores the received data as a first amount of dispensed fuel in the memory 212, in a database stored in the memory 212, or a database or other data storage accessible via the network 125 of FIG. 1. This stored first amount is updated as fuel is dispensed from the fuel pump 101 as may be periodically communicated to the dispensed fuel monitoring module of site controller 110 from the fuel controller 105. The dispensed fuel monitoring module monitors data communication connectivity with the fuel controller 105. The dispensed fuel monitoring module, upon detecting a loss of connectivity, such when the connection is continuous or when a data connection cannot be established on an ad-hoc or scheduled basis, the fuel controller 105 attempts to reestablish the data connectivity. When the data connectivity is reestablished between the fuel controller 105 and the dispensed fuel monitoring module of the site controller 110, data representative of the dispensed fuel amount is pushed to or retrieved by the dispensed fuel monitoring module. This is a second amount of dispensed fuel. The dispensed fuel monitoring module then compares the second amount of dispensed fuel to the stored first amount of dispensed fuel. The dispensed fuel monitoring module may then trigger an alarm process when the second amount of dispensed fuel does not match the stored first amount of dispensed fuel as this may indicate fuel theft. However, in these and some other embodiments, when data connectivity is lost or cannot be reestablished for a period, the dispensed fuel monitoring module may trigger the same or a different alarm processes. Data representative of the second amount of dispensed fuel may then be stored in addition to or in replacement of the first stored amount.

In some embodiments, the alarm process is a process of the dispensed fuel monitoring module, the site controller 110, of the web host 115 as may be called by the dispensed fuel monitoring module or the site controller 110, or a process of another entity accessible via the network 125. In other embodiments, the alarm process may be located and executable in whole or in part in one or more of these locations and call processes or services of other network 125 entities, such as for purposes of triggering alarms, providing notifications, disabling or enabling functions of one or more devices, such as functions of a fuel controller 105, a site controller 110, and the like.

The alarm process of such embodiments may be a defined process that may sound audible alarms, provide visual alarm indicators, send text-based messages, emails, and perform other actions. In some embodiments, the alarm process may be configured or customized according to fuel station operator preferences. The configuration settings may identify one or more addresses, such as email addresses or telephone numbers of one or more user devices 120, to which notifications are to be sent. The configuration settings may also, or alternatively, identify one or more actions to be performed, such as disabling one or more fuel pumps, triggering video recording or other image capturing with regard to a location of an offending fuel pump. Regardless, the alarm process provides a notification of potential fuel theft.

In some such embodiments, the fuel controller 105 from which the dispensed fuel monitoring module receives data representative of dispensed fuel amounts is present in a fuel pump housing that includes a plurality of fuel pumps 101. The plurality of fuel pumps 101 may be for each of two or more fuel grades or types offered for sale from the fuel pump housing. Thus, when the data representative of a dispensed fuel amount is transmitted by the fuel controller 105 to the dispensed fuel monitoring module of the site controller 110, the transmitted data includes data identifying the respective fuel pump 101. The fuel pump identifying data is also utilized by the dispensed fuel monitoring module to track dispensed fuel amounts from each of the respective fuel pumps.

Figure 3:
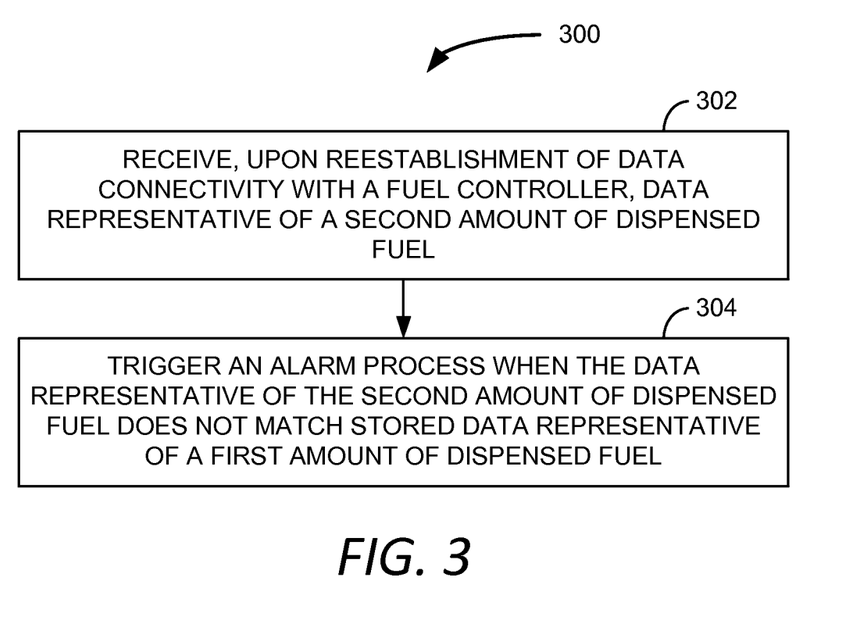
FIG. 3 is a block flow diagram of a method, according to an example embodiment.

FIG. 3 is a block flow diagram of a method 300, according to an example embodiment. The method 300 is an example of operations that maybe performed on one or more computing devices, such as the apparatus 200 of FIG. 2, implemented as a site controller 110 of FIG. 1. The method 300 may be performed by in whole or in part in software that executes on the site controller or is accessed thereby, such as on a web host 115 of FIG. 1. In some embodiments, the method 300 may be performed by a dispensed fuel monitoring module.

The method 300 includes receiving 302, upon reestablishment of data connectivity with a fuel controller via a data interface device, data representative of a second amount of dispensed fuel. The method 300 further includes triggering 304 an alarm process when the data representative of the second amount of dispensed fuel does not match stored data representative of a first amount of dispensed fuel. In some embodiments, the triggered 304 alarm process is executable according to at least one configuration setting to provide a notification of potential fuel theft.

The alarm process, in some embodiments, requests data from the fuel controller via the data interface device of an amount of fuel dispensed in a current transaction. The alarm process, or another portion of the method 300, may then determine whether the amount of fuel dispensed in the current transaction accounts for the mismatch between the first and second dispensed fuel amounts. When the amount of fuel dispensed in the current transaction does not account for the mismatch, the alarm process may then perform a remedial action. In some embodiments, the remedial action includes transmitting a command to the fuel controller via the data interface device to terminate the current transaction. The remedial action may also or alternatively include one or more of sending a Simple Message Service (SMS) text message, a chat message, an email, providing one or more audible and visual alarms, among other possible actions.

Figure 4:
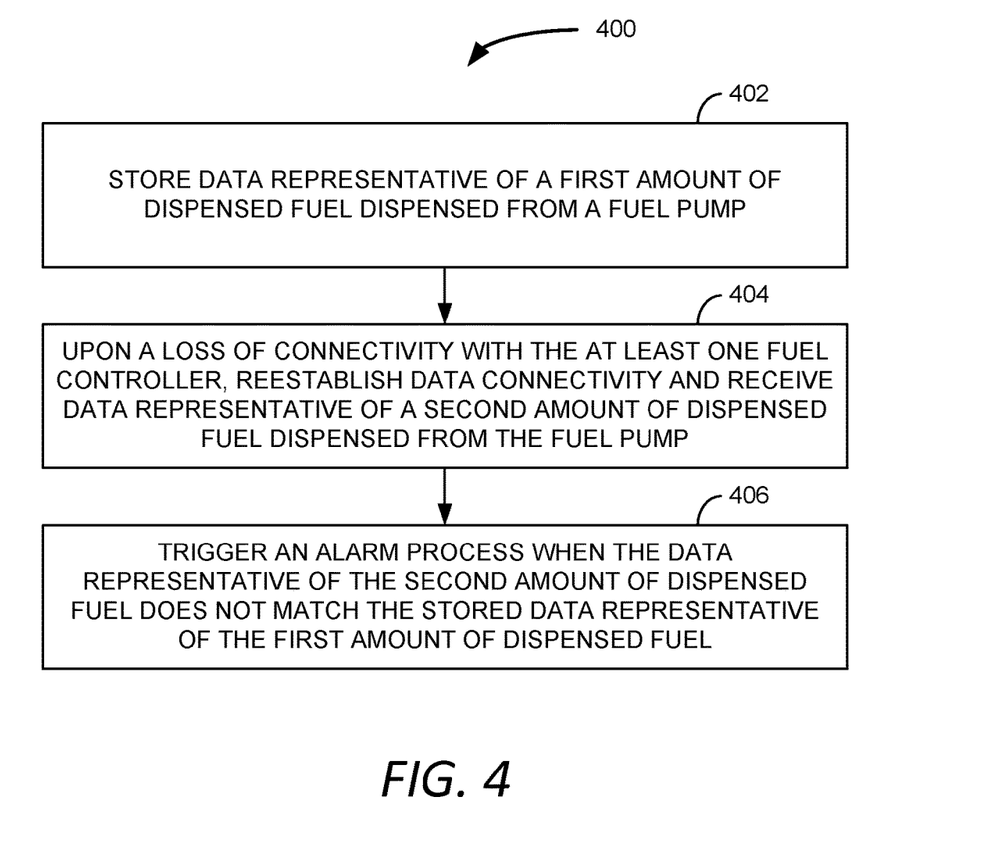
FIG. 4 is a block flow diagram of a method, according to an example embodiment.

FIG. 4 is a block flow diagram of a method 400, according to an example embodiment. The method 400, similar to the method 300 of FIG. 3, is an example of operations that maybe performed on one or more computing devices, such as the apparatus 200 of FIG. 2, implemented as a site controller 110 of FIG. 1. The method 400 may be performed by in whole or in part in software that executes on the site controller or is accessed thereby, such as on a web host 115 of FIG. 1. In some embodiments, the method 400 may be performed by a dispensed fuel monitoring module.

Some embodiments of the method 400 include establishing data connectivity with at least one fuel controller. These and other embodiments of the method 400 include storing 402 data received via the established data connection, the stored data representative of a first amount of dispensed fuel dispensed from a fuel pump. The method 400 further includes, upon a loss of connectivity with the at least one fuel controller, reestablishing 404 data connectivity and receiving data representative of a second amount of dispensed fuel dispensed from the fuel pump. The method 400 may then trigger 406 an alarm process when the data representative of the second amount of dispensed fuel does not match the stored data representative of the first amount of dispensed fuel.

In some embodiments of the method 400, the data representative of the first amount of dispensed fuel is stored with regard to each fuel pump for which the fuel controller is associated and is updated for a respective fuel pump at conclusion of a transaction involving the respective fuel pump.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
  receiving, upon reestablishment of data connectivity, via a data interface device, with a fuel controller after a loss of a continuous data connectivity with the fuel controller, data representative of a second amount of dispensed fuel;
  triggering an alarm process when the data representative of the second amount of dispensed fuel does not match stored data representative of a first amount of dispensed fuel, the alarm processing including:
    requesting data from the fuel controller via the data interface device of an amount of fuel dispensed in a current transaction;
    determining whether the amount of fuel dispensed in the current transaction accounts for the mismatch between the first and second dispensed fuel amounts; and
    performing a remedial action when the amount of fuel dispensed in the current transaction does not account for the mismatch; and
  wherein:
    the data representative of the first and second dispensed fuel amounts includes data representative of measurements taken by a feedstock meter of a fuel pump of the first and second dispensed fuel amounts, the feedstock meter measuring a total amount of fuel dispensed from the fuel pump without regard to a specific transaction, the fuel pump being one of a plurality of fuel pumps monitored by the fuel controller; and
    the method is performed by a computing device located remotely from a location where the fuel is dispensed and remotely from the fuel controller.

2. The method of claim 1, wherein the triggered alarm process is executable according to at least one configuration setting to provide a notification of potential fuel theft.

3. The method of claim 1, wherein the remedial action includes transmitting a command to the fuel controller via the data interface device to terminate the current transaction.

4. The method of claim 1, wherein the data representative of the first amount of dispensed fuel is stored in a database and wherein the data representative of the second amount of dispensed fuel, when received, is stored to the database.

5. The method of claim 1, wherein:
data representative of amounts of dispensed fuel received via the data interface device from the fuel controller includes data with regard to a plurality of fuel pumps associated with the fuel controller, the received data including data identifying a fuel pump for which the data is associated; and
the triggering of the alarm process is performed with regard to the first and second dispensed fuel amounts dispensed by a particular fuel pump.

6. The method of claim 1, wherein the data representative of the first amount of dispensed fuel is:
stored with regard to each fuel pump for which the fuel controller is associated;
updated for a respective fuel pump at conclusion of a transaction involving the respective fuel pump.

7. A system comprising:
at least one computer processor, at least one memory device, and at least one data interface device;
a dispensed fuel monitoring module, stored on the at least one memory device and executable by the at least one processor to:
establish continuous data connectivity with at least one fuel controller via the at least one data interface device;
store, on the at least one memory device, data representative of a first amount of dispensed fuel dispensed from a fuel pump, the first amount of dispensed fuel measured by a feedstock meter of the fuel pump, the feedstock meter measuring a total amount of fuel dispensed from the fuel pump without regard to a specific transaction, the fuel pump being one of a plurality of fuel pumps monitored by the dispensed fuel monitoring module;
upon a loss of the continuous data connectivity with the at least one fuel controller, reestablish a second continuous data connectivity and receive data representative of a second amount of dispensed fuel dispensed from the fuel pump, the second amount of dispensed fuel measured by the feedstock meter of the fuel pump;
trigger an alarm process when the data representative of the second amount of dispensed fuel does not match the stored data representative of the first amount of dispensed fuel, the alarm process including performing at least one remedial action; and
wherein the system is located remotely from a location of any fuel controller or fuel pump.

8. The system of claim 7, wherein the triggered alarm process is executable by the at least one processor according to at least one configuration setting stored on the at least one memory device to provide a notification of potential fuel theft.

9. The system of claim 8, wherein the at least one configuration setting identifies an address to which an alarm notification is to be sent via the at least one data interface device.

10. The system of claim 9, wherein the address of the at least one configuration setting is a telephone number to which a text-based message is to be sent upon the triggering of the alarm process.

11. The system of claim 7, wherein the data representative of the first amount of dispensed fuel is stored in a database stored on the at least one memory device and wherein the data representative of the second amount of dispensed fuel, when received, is stored to the database.

12. The system of claim 7, wherein:
data representative of amounts of dispensed fuel received via the at least one data interface device from the fuel controller includes data with regard to a plurality of fuel pumps associated with the fuel pump controller, the received data including data identifying a fuel pump for which the data is associated; and
the triggering of the alarm process is performed with regard to the first and second amounts of dispensed fuel dispensed by the same fuel pump.

13. The system of claim 7, wherein the data interface device is a network interface device.

14. A non-transitory computer-readable medium, with instructions stored thereon that are executable by at least one computer processor to cause a device to:
receive, upon reestablishment of data connectivity, via a data interface device, with a fuel controller after a loss of a continuous data connectivity with the fuel controller, data representative of a second amount of dispensed fuel;
trigger an alarm process when the data representative of the second amount of dispensed fuel does not match stored data representative of a first amount of dispensed fuel, the alarm processing including:
requesting data from the fuel controller via the data interface device of an amount of fuel dispensed in a current transaction;
determining whether the amount of fuel dispensed in the current transaction accounts for the mismatch between the first and second dispensed fuel amounts; and
performing a remedial action when the amount of fuel dispensed in the current transaction does not account for the mismatch; and
wherein:
the data representative of the first and second dispensed fuel amounts includes data representative of measurements taken by a feedstock meter of a fuel pump of the first and second dispensed fuel amounts, the feedstock meter measuring a total amount of fuel dispensed from the fuel pump without regard to a specific transaction, the fuel pump being one of a plurality of fuel pumps monitored by the fuel controller; and
the method is performed by a computing device located remotely from a location where the fuel is dispensed and remotely from the fuel controller.

15. The non-transitory computer-readable medium of claim 14, wherein the data representative of the first amount of dispensed fuel is stored in a database and wherein the data representative of the second amount of dispensed fuel, when received, is stored to the database.

16. The non-transitory computer-readable medium of claim 14, wherein:
data representative of amounts of dispensed fuel received via the data interface device from the fuel controller includes data with regard to a plurality of fuel pumps associated with the fuel controller, the received data including data identifying a fuel pump for which the data is associated;

the triggering of the alarm process is performed with regard to the first and second dispensed fuel amounts dispensed by a particular fuel pump.

17. The non-transitory computer-readable medium of claim 14, wherein the data representative of the first amount of dispensed fuel is:

stored with regard to each fuel pump for which the fuel controller is associated; and is updated for a respective fuel pump at conclusion of a transaction involving the respective fuel pump.

* * * * *